(12) United States Patent
Lee

(10) Patent No.: US 7,365,812 B2
(45) Date of Patent: Apr. 29, 2008

(54) FLAT PANEL DISPLAY APPARATUS WITH GROUNDED PCB

(75) Inventor: Sang-Duk Lee, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 704 days.

(21) Appl. No.: 10/747,672

(22) Filed: Dec. 30, 2003

(65) Prior Publication Data

US 2004/0257515 A1 Dec. 23, 2004

(30) Foreign Application Priority Data

Dec. 30, 2002 (KR) ............... 10-2002-0086901

(51) Int. Cl.
*G02F 1/1333* (2006.01)
*G02F 1/1345* (2006.01)

(52) U.S. Cl. ............... 349/60; 349/59; 349/149; 349/150

(58) Field of Classification Search ............ 349/58–60, 349/149–152
See application file for complete search history.

(56) References Cited

U.S. PATENT DOCUMENTS

| 5,675,396 | A | * | 10/1997 | Tsunehiro | 349/59 |
|---|---|---|---|---|---|
| 6,175,396 | B1 | * | 1/2001 | Kim et al. | 349/58 |
| 6,411,352 | B1 | * | 6/2002 | Kim | 349/58 |
| 6,587,166 | B1 | * | 7/2003 | Lee et al. | 349/58 |
| 6,847,417 | B2 | * | 1/2005 | Kim | 349/58 |

| 2002/0159001 | A1 | * | 10/2002 | Kim | 349/58 |
|---|---|---|---|---|---|
| 2003/0098940 | A1 | * | 5/2003 | Lee | 349/149 |

FOREIGN PATENT DOCUMENTS

| JP | 3-243922 | 10/1991 |
|---|---|---|
| JP | 10-135683 | 5/1998 |
| JP | 10-268272 | 10/1998 |
| JP | 11-281966 | 10/1999 |
| JP | 2000-231104 | 8/2000 |
| JP | 2002-333606 | 11/2002 |
| JP | 2002-333607 | 11/2002 |

(Continued)

OTHER PUBLICATIONS

Patent Abstracts of Japan, Publication No. 03-243922, Oct. 30, 1991, 2 pp.

(Continued)

*Primary Examiner*—Andrew Schechter
*Assistant Examiner*—Lauren Nguyen
(74) *Attorney, Agent, or Firm*—MacPherson Kwok Chen & Heid LLP

(57) ABSTRACT

A flat panel display apparatus comprises a flat panel display module; a control PCB placed in one rear edge area of the flat panel display module and having a conductive grounding part; and a grounding contact member including a rear contact part contacting the grounding part of the control PCB, and a side contact part bent from the rear contact part and contacting one edge of the flat panel display module, and grounding the control PCB. With this configuration, the present invention provides a flat panel display apparatus in which a control PCB having the length shorter than the width of a flat panel display module is easily grounded and the production cost thereof is decreased.

16 Claims, 4 Drawing Sheets

FOREIGN PATENT DOCUMENTS

JP        2003-177379        6/2003

OTHER PUBLICATIONS

Patent Abstracts of Japan, Publication No. 10-135683, May 22, 1998, 2 pp.
Patent Abstracts of Japan, Publication No. 11-281966, Oct. 15, 1999, 2 pp.
Patent Abstracts of Japan, Publication No. 2000-231104, Aug. 22, 2000, 2 pp.
Patent Abstracts of Japan, Publication No. 2002-333606, Nov. 22, 2002, 2 pp.
Patent Abstracts of Japan, Publication No. 2002-333607, Nov. 22, 2002, 2 pp.
Patent Abstracts of Japan, Publication No. 2003-1777379, Jun. 27, 2003, 1 p.
Office Action mailed Feb. 27, 2007 for corresponding Japanese Patent Application (5 pp.), no english translation.

* cited by examiner

FLAT PANEL DISPLAY APPARATUS WITH GROUNDED PCB

CROSS-REFERENCE TO RELATED APPLICATIONS

This application claims the benefit of Korean Patent Application No. 2002-0086901, filed Dec. 30, 2002, in the Korean Intellectual Property Office, the disclosure of which is incorporated herein by reference.

BACKGROUND OF THE INVENTION

1. Field of the Invention

The present invention relates to a flat panel display apparatus, and more particularly, to a flat panel display apparatus improved in a grounding structure of a control PCB (printed circuit board).

2. Description of the Related Art

A flat panel display apparatus includes an LCD (liquid crystal display), a PDP (plasma display panel), a VFD (vacuum fluorescent display), an FED (field emission display), an ELD (electro luminescence display), etc.

Making of the LCD includes arranging a plurality of TFTs (thin film transistors) onto a transparent glass substrate through a semiconductor thin film process, and forming a pixel electrode related to each TFT. Here, the transparent glass substrate containing the TFTs will be called a TFT array substrate.

In correspondence to the pixel electrode formed on the TFT array substrate, there is provided a common electrode formed on a color filter substrate so as to allow an electric field to be produced between the pixel electrode and the common electrode when voltage is applied to the pixel electrode. Here, the color filter substrate is spaced from the TFT array substrate at a predetermined distance. Further, between the TFT array substrate and the color filter substrate are filled liquid crystals which move according to the electric field.

Methods of bonding an LCD driver IC (integrated chip) to the TFT array substrate,include a TAB (tape automated bonding) method, a COG (chip on glass) method, etc.

In the TAB method, the LCD driver IC is attached to a flexible TCP (tape carrier package), and a first end of the TCP is connected to one front edge of the TFT array substrate and a second end thereof is connected to a source PCB (printed circuit board). Then, the source PCB is connected to a control PCB.

In the COG method, the LCD driver IC is directly mounted on the TFT array substrate by flip chip technology, being connected with a gate bus-line and a data bus-line formed on the TFT array substrate. Then, the TFT array substrate is connected to the control PCB through an FPC (flexible printed circuit). Here, the FPC is connected to the gate and data bus-lines in the middle of the one front edge of the TFT array substrate on which the LCD driver IC is mounted, thereby transmitting a predetermined control signal from the control PCB to the LCD driver IC. The COG method can decrease the packaging size and the production cost of the LCD, so that a COG type LCD is being widely used today.

The control PCB is provided in the rear of the flat panel display module on which a picture is displayed. While the LCD operates, the control PCB produces an EMI (electromagnetic interference) disturbing the performance of the LCD, e.g., deteriorating the picture being displayed. Therefore, the control PCB should be grounded so as to prevent the EMI.

Generally, in the case of the LCD like a TAB type LCD, in which the length of the control PCB or the source PCB is approximately equal to the width of the flat panel display module, either the control PCB or the source PCB is provided with a conductive grounding part on opposite ends thereof, and the conductive grounding part is combined to a chassis forming an outer enclosure of the flat panel display module with screws, so that the control PCB is both grounded and combined to the chassis.

However, if the LCD has the control PCB whose length is shorter than the width of the flat panel display module, it is difficult to ground the control PCB in the above-described manner. For example, in the case of the COG type LCD, the control PCB is placed in the middle of the rear edge area of the flat panel display module, and the FPC has the width shorter than that of the flat panel display module and is placed in the middle of the edge of the flat panel, so that it is difficult to ground the control PCB in the above-described manner using the screws.

SUMMARY OF THE INVENTION

Accordingly, it is an aspect of the present invention to provide a flat panel display apparatus in which a control PCB having the length shorter than the width of a flat panel display module is easily grounded.

Additional aspects and advantages of the invention will be set forth in part in the description which follows and, in part, will be obvious form the description, or may be learned by practice of the invention.

The foregoing and other aspects of the present invention are achieved by providing a flat panel display apparatus comprising a flat panel display module; a control PCB placed in one rear edge area of the flat panel display module and having a conductive grounding part; and a grounding contact member including a rear contact part contacting the grounding part of the control PCB, and a side contact part bent from the rear contact part and contacting one edge of the flat panel display module, and grounding the control PCB.

According to an aspect of the invention, the control PCB has the length shorter than the width of the flat panel display module, and is placed in an approximate middle portion of an upper rear edge area of the flat panel display module.

According to an aspect of the invention, the flat panel display apparatus further comprises a PCB cover placed behind the control PCB and combined to the flat panel display module so as to protect the control PCB.

According to an aspect of the invention, the grounding contact member is attached to the grounding part of the control PCB by an adhesive means.

According to an aspect of the invention, the PCB cover includes a rear covering part covering behind the control PCB, and a side combining part bent from the PCB covering part and combined to a side part of the flat panel display module.

According to an aspect of the invention, the rear covering part of the PCB cover is formed with a grounding hole corresponding to the grounding part of the control PCB, and the side combining part of the PCB cover is formed with a cutting part through which the side contact part of the grounding contact member can contact the side part of the flat panel display module.

According to an aspect of the invention, on the rear surface of the flat panel display module is formed a supporting rib protruding toward the control PCB and contact-supporting circumference of the control PCB at least partially so as to leave a space between the control PCB and the rear surface of the flat panel display module.

According to an aspect of the invention, an edge area of the control PCB is formed with a supporting hole, and the supporting rib is formed with a supporting boss protruding toward the control PCB and inserted into the supporting hole of the control PCB.

According to an aspect of the invention, the flat panel display module comprises an LCD panel displaying a picture thereon, a backlight assembly provided in the rear of the LCD panel and illuminating the LCD panel, and a chassis surrounding the circumference of the LCD panel.

According to an aspect of the invention, the backlight assembly comprises a light guide plate placed in the rear of the LCD panel, a lamp unit illuminating the light guide plate, and a mold frame placed in the rear of the light guide plate and combined with the chassis so as to accommodate and support the light guide plate and the lamp unit, and the control PCB is placed in one rear edge area of the mold frame.

According to an aspect of the invention, on the rear surface of the mold frame is formed a supporting rib protruding toward the control PCB.

BRIEF DESCRIPTION OF THE DRAWINGS

These and other aspects and advantages of the present invention will become apparent and more readily appreciated from the following description of the embodiments, taken in conjunction with the accompany drawings of which.

DETAILED DESCRIPTION OF THE PREFERRED EMBODIMENT

Figure 1:
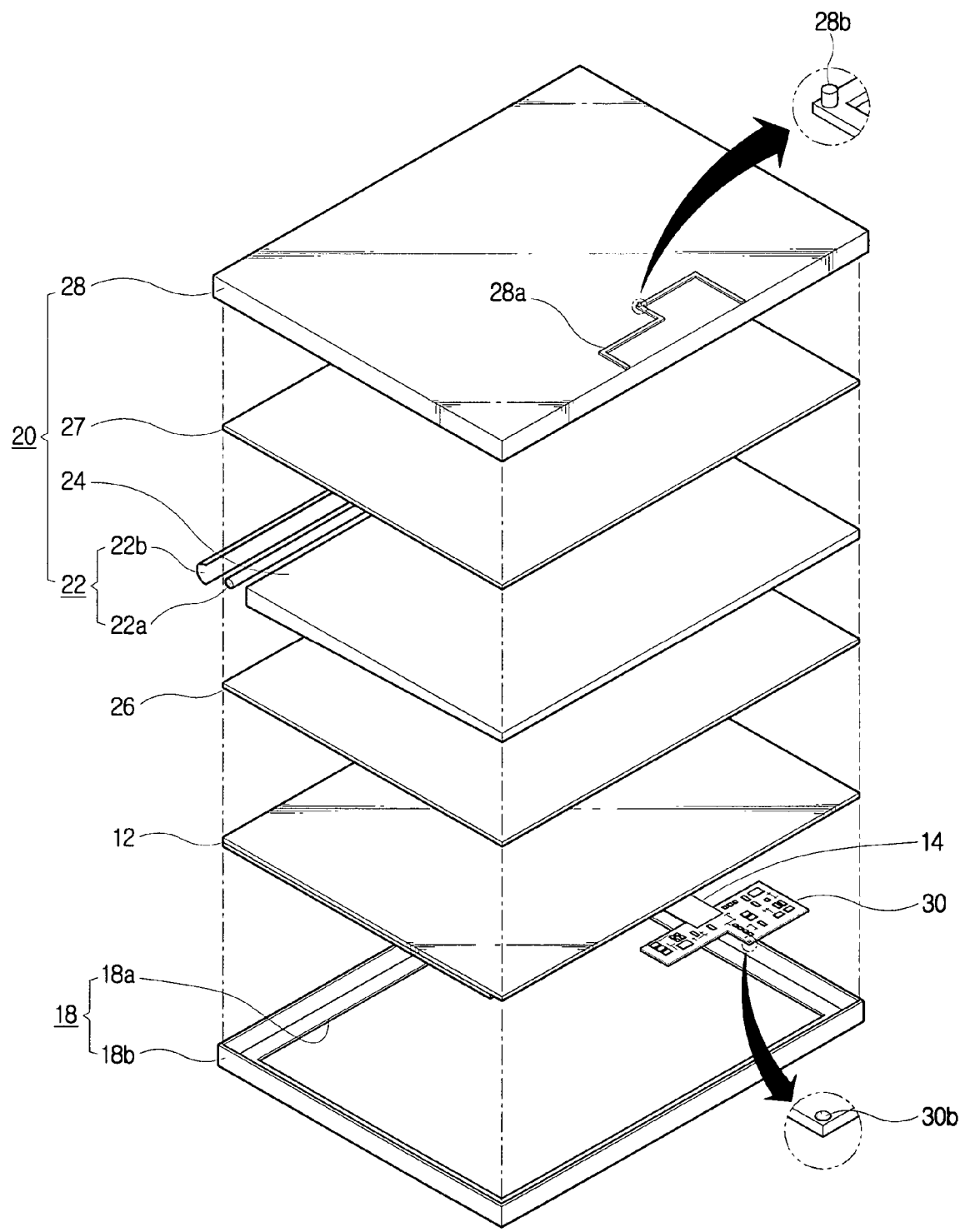
FIG. 1 is an exploded rear perspective view of an LCD apparatus according to the present invention.

Reference will now be made in detail to the embodiments of the present invention, examples of which are illustrated in the accompanying drawings, wherein like reference numerals refer to like elements throughout. The embodiments are described below in order to explain the present invention by referring to the figures.

In these embodiments, a COG type LCD will be exemplarily described as a flat panel display apparatus.

Figure 2:
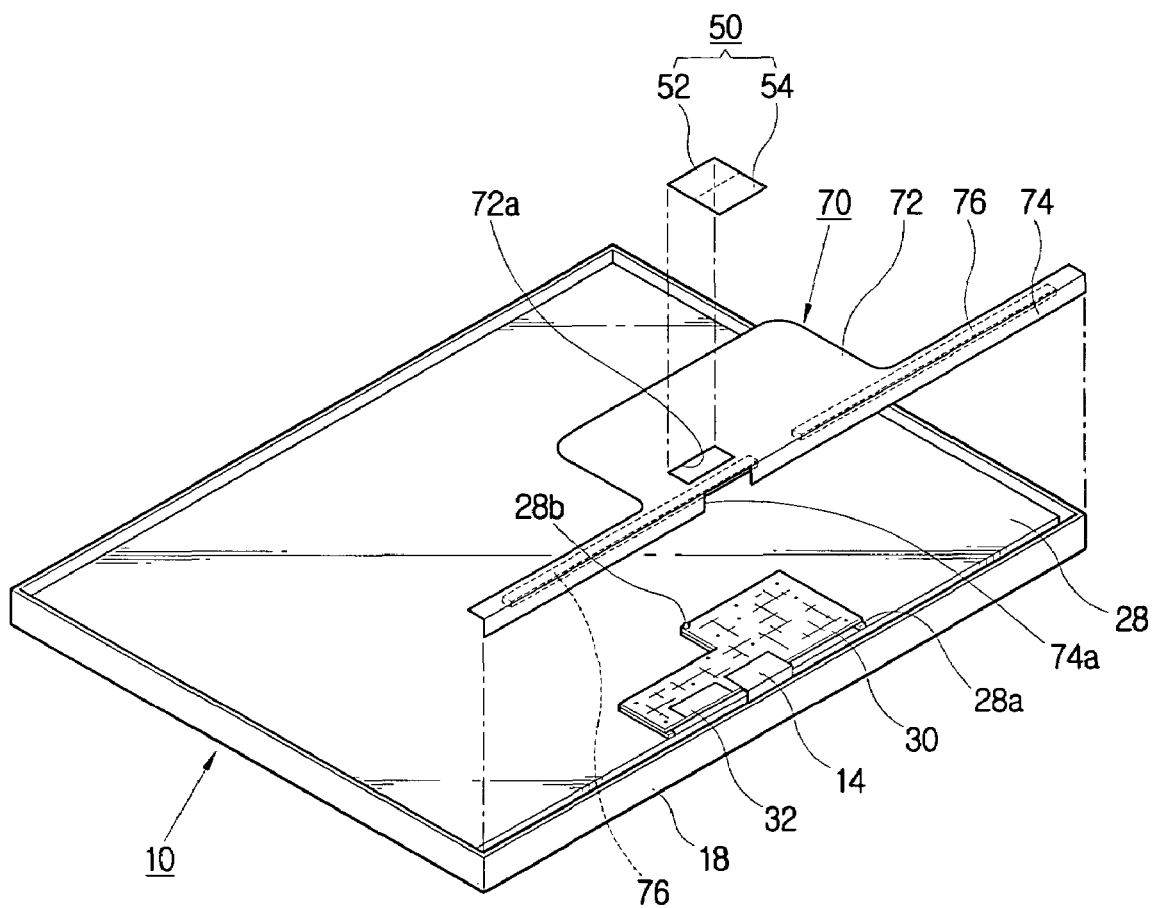
FIG. 2 is a perspective view illustrating a control PCB, a flat panel display module and a PCB cover before they are combined together in the LCD apparatus according to the present invention.

As shown in FIGS. 1 and 2, a COG type LCD according to the present invention comprises a flat panel display module 10 on which a picture is displayed; a control PCB 30 placed in one rear edge area of the flat panel display module 10 and provided with a conductive grounding part 32 on the rear surface thereof; and a grounding contact member 50 allowing the grounding part 32 of the control PCB 30 to contact the flat panel display module 10. The flat panel display module 10 and the control PCB 30 are covered with front and rear cases (not shown), to thereby be accommodated and supported therein.

The flat panel display module 10 comprises an LCD panel 12 displaying a picture thereon, a backlight assembly 20 provided in the rear of the LCD panel 12 and illuminating the LCD panel 12, and a chassis 18 combined with a mold frame 28 (to be described later) of the backlight assembly 20 so as to surround front edges of the LCD display panel 12.

The LCD panel 12 includes a TFT array substrate formed with switching devices and pixel electrodes, a color filter substrate, and a liquid crystal filled between the TFT array substrate and the color filter substrate. On the TFT array substrate is mounted with a plurality of LCD driver ICs by flip chip technology, and each LCD driver IC is connected with a gate bus-line and a data bus-line formed on the TFT array substrate. The LCD driver IC is connected to a first end of an FPC (flexible printed circuit) 14, and a second end of the FPC 14 is connected to the control PCB 30. Here, the FPC 14 is connected to the gate and data bus-lines in the middle of one surface edge area of the TFT array substrate on which the LCD driver IC is mounted, thereby transmitting a predetermined control signal from the control PCB to the LCD driver IC. Thus, a video control signal is transmitted from the control PCB 30 to the LCD driver IC through the FPC 14, and the LCD driver IC controls a plurality of transistors of the TFT array substrate according to the video control signal to display a picture with light from the backlight assembly 20. Here, the width of the FPC 14 is smaller than that of the backlight assembly 20. Further, the FPC 14 bends over an upper edge of the backlight assembly 20 in the approximate middle of the upper edge, thereby positioning the control PCB 30 connecting with the FPC 14 in the rear of the backlight assembly 20.

Behind the LCD panel 12 is provided the backlight assembly 20 to uniformly illuminate the LCD panel 12. The backlight assembly 20 comprises a lamp unit 22, a light guide plate 24, an optical sheet layer 26, a reflector 27, and the mold frame 28 supporting them.

The lamp unit 22 is placed in a side part of the light guide plate 24, and includes a lamp 22a emitting light, and a lamp reflector 22b reflecting the light from the lamp 22a into the light guide plate 24. The light guide plate 24 guides the light from the lamp 22a uniformly toward the optical sheet layer 26. The reflector 27 is placed behind the light guide plate 24 and reflects the light directing to the reflector 27 into the light guide plate 24, thereby decreasing a light loss. The optical sheet layer 26 is placed in front of the light guide plate 24 so as to enhance brightness of the LCD, etc.

The mold frame 28 is placed in the rear of the flat panel display module 10. On the rear surface of the mold frame 28 is formed a supporting rib 28a protruding toward the control PCB 30 so as to contact-support the circumference of the control PCB 30 at least partially. The supporting rib 28a contacts the circumference of the control PCB 30 when the control PCB 30 is positioned in the rear of the backlight assembly 20 according as the FPC 14 is bent, thereby leaving a space between the control PCB 30 and the mold frame 28. Thus, a plurality of chips mounted on the control PCB 30 and facing the mold frame 28 is protected from damage due to the contact with the mold frame 28.

The supporting rib 28a is formed with a supporting boss 28b protruding toward the control PCB 30 and inserted into a supporting hole 30b formed on the control PCB 30. Thus, the control PCB 30 is prevented from planar-moving in the state that it is positioned on the rear of the backlight assembly 20.

The chassis 18 has a rectangular shape like the mold frame 28, with a front opening 18*a* to expose the LCD panel 12. Corners of the chassis 18 are bent along corners of the mold frame 28, thereby surrounding the circumference of the mold frame 28. Thus, a side contact part 54 (to be described later) of the grounding contact member 50 contacts a side part 18*b* of the chassis 18, thereby grounding the control PCB 30. The chassis 18 is generally made of conductive stainless material, and may be made of other conductive material.

Figure 3:
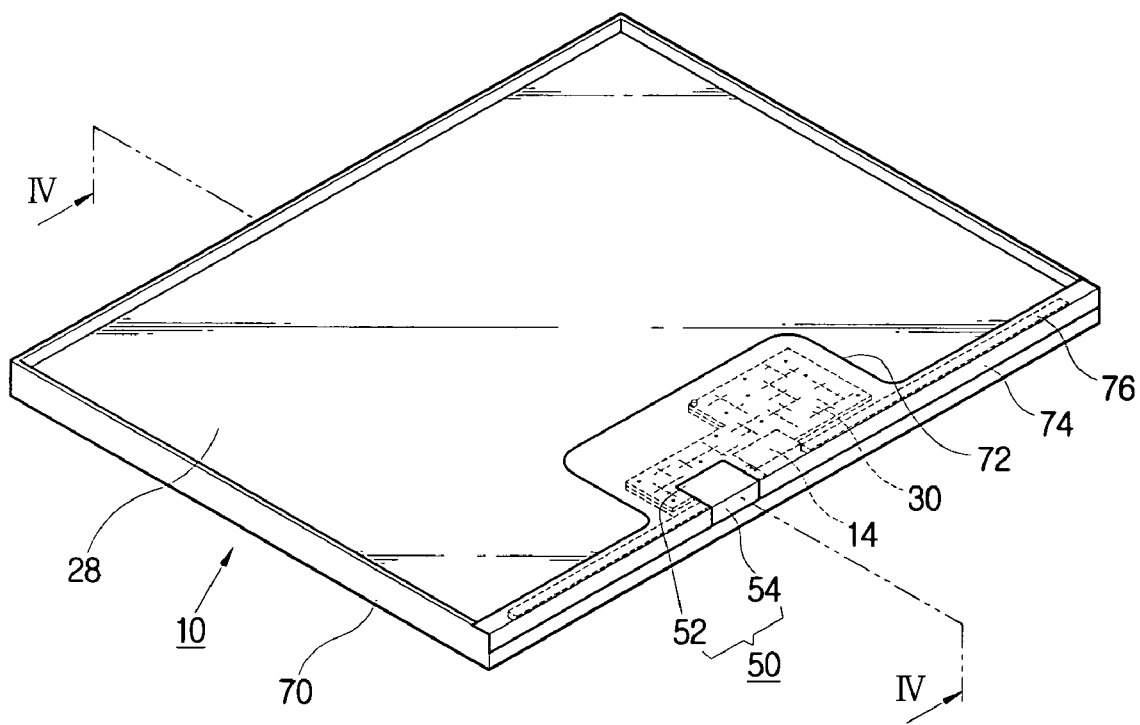
FIG. 3 is a perspective view illustrating the state that the control PCB and the PCB cover are combined to the rear of the flat panel display module of FIG. 2.
Figure 4:
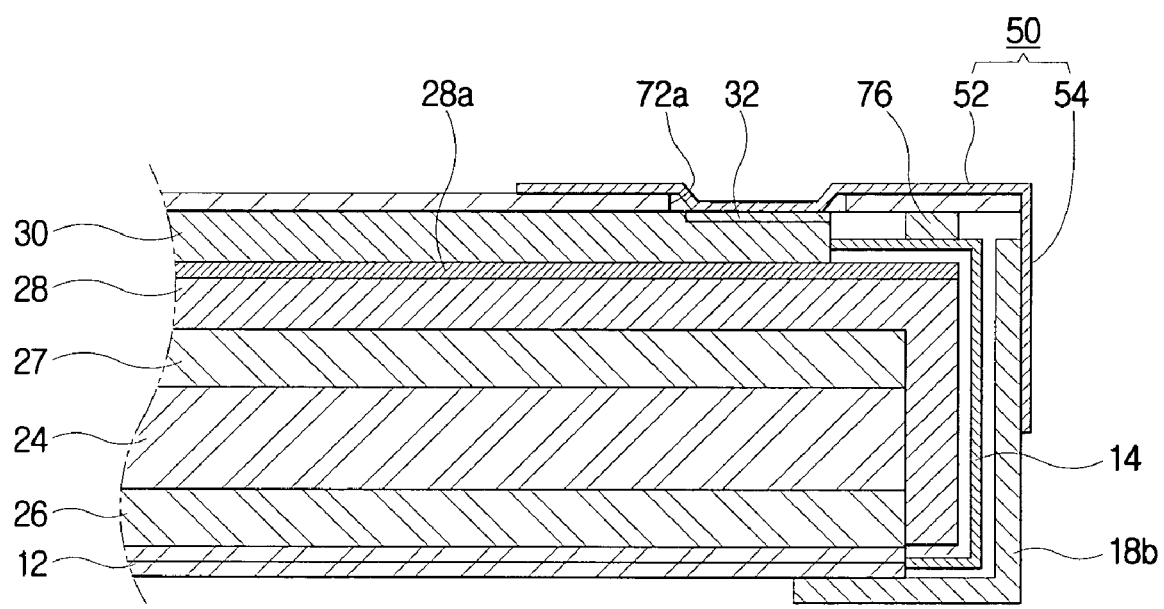
FIG. 4 is a sectional view taken along line IV-IV in FIG. 3.

As shown in FIGS. 2 through 4, the control PCB 30 is positioned in the rear of the mold frame 28 behind the flat display module 10, and is connected to the LCD driver IC through the FPC 14, thereby controlling the video control signal transmitted to the LCD driver IC. Here, the control PCB 30 has the length shorter than the width of the flat panel display module 10, and is, as shown in FIG. 3, placed in the approximate middle portion of an upper rear edge area of the flat panel display module 10.

On the rear of the control PCB 30 is provided the conductive grounding part 32. Thus, the grounding part 32 contacts a rear contact part 52 of the grounding contact member 50 behind the control PCB 30.

The grounding contact member 50 includes the rear contact part 52 being in contact with the grounding part 32 of the control PCB 30, and the side contact part 54 bent from the rear contact part 52 and being in contact with the side part 18*b* of the chassis 18. Here, the grounding contact member 50 is made of conductive material foil such as aluminum foil, copper foil, etc., thereby grounding the control PCB 30 to the flat panel display module 10.

The rear contact part 52 contacts the grounding part 32 of the control PCB 30 in the rear of the control PCB 30. Here, if the grounding part 32 is provided on the front of the control PCB 30, the rear contact part 52 of the grounding contact member 50 is placed between the flat panel display module 10 and the control PCB 30 and contacts the grounding part 32 of the control PCB 30 from front of the control PCB 30.

The side contact part 54 is bent from the rear contact part 52, and contacts the side part 18*b* of the chassis 18 surrounding the circumference of the flat panel display module 10, thereby grounding the grounding part 32 of the control PCB 30.

The rear contact part 52 and the side contact part 54 are respectively attached to the grounding part 32 of the control PCB 30 and the side part 18*b* of the chassis 18 by glue, an adhesive tape, etc.

Behind the control PCB 30 is provided a PCB cover 70 combined to the flat panel display module 10 and protecting the control PCB 30. The PCB cover 70 includes a rear covering part 72 covering the rear surface of the control PCB 30 so as to protect the control PCB 30, and a side combining part 74 bent from the PCB covering part 72 and combined to the side part 18*b* of the chassis 18.

On the rear covering part 72 is formed a grounding hole 72*a* corresponding to the grounding part 32 of the control PCB 30. Thus, the rear contact part 52 of the grounding contact member 50 contacts the grounding part 32 of the control PCB 30 through the grounding hole 72*a* in the rear of the PCB cover 70. Further, on the side combining part 74 of the PCB cover 70 is formed a cutting part 74*a* through which the side contact part 54 of the grounding contact member 50 can contact the side part 18*b* of the chassis 18. Thus, in the state that the grounding contact member 50 is in contact with the rear surface of the PCB cover 70, the PCB cover 70 is easily combined to the flat panel display module 10 in the rear of the control PCB 30.

Preferably, the rear covering part 72 has enough size and shape to cover the whole rear surface of the control PCB 30, and is made of PET (polyethylene terephthalate). Preferably, a double coated adhesive tape can be employed in combining the rear covering part 72 to the flat panel display module 10.

Preferably, inside the rear covering part 72 is formed a spacing rib 76 protruding toward the rear surface of the flat panel display module 10. The spacing rib 76 is placed in a space due to the thickness of the control PCB 30 between the flat panel display module 10 and the PCB cover 70, and supports the PCB cover 70 being combined to the rear surface of the flat panel display module 10.

The side combining part 74 is combined to the side part 18*b* of the chassis 18 by glue, an adhesive tape, a screw, etc. Thus, the PCB cover 70 is firmly combined to the flat panel display module 10, thereby effectively preventing the control PCB 30 from moving.

In the above-described embodiment, the COG type LCD was exemplarily described as a flat panel display apparatus. However, the scope of the present invention is not limited to the COG type LCD. For example, in the case of an ELD (electro luminescence display), if the ELD has a control PCB whose length is shorter than the width of a flat panel display module of the ELD, the scope of the present invention can be applied to the ELD. In the ELD, the flat panel display module comprises a plurality of organic thin films piled between a positive electrode formed by an ITO (indium tin oxide) as a transparent electrode and a negative electrode made of metal having a low work function and is supported by a chassis and a mold frame corresponding to the foregoing chassis 18 and the foregoing mold frame 28, and the control PCB is placed in the rear edge area of the mold frame. Thus, the grounding structure according to the present invention can be applied to the ELD.

In the above-described embodiment, the grounding part 32 is provided on the rear surface of the control PCB 30 and contacts the rear contact part 52 of the grounding contact member 50 behind the control PCB 30. However, the grounding part 32 may be provided in the front of the control PCB 30. In this case, the grounding contact member 50 is placed in front of the control PCB 30 and contacts the grounding part 32 of the control PCB 30.

As described above, there is provided a conductive grounding contact member 50 including the rear contact part 52 contacting the grounding part 32 of the control PCB 30, and the side contact part 54 bent from the rear contact part 52 and contacting the one edge of the flat panel display module 10, so that the control PCB 30 can be easily grounded in the case that the length of the control PCB 30 to be placed behind the flat panel display module 10 is shorter than the width of the flat panel display module.

As described above, the present invention provides a flat panel display apparatus in which a control PCB having the length shorter than the width of a flat panel display module is easily grounded and the production cost thereof is decreased.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A flat panel display apparatus comprising:
a flat panel display module comprising a mold frame and a chassis having a side part;
a control printed circuit board (PCB) positioned in a rear edge area of the flat panel display module and having a conductive grounding part, the control PCB having the length shorter than the width of the flat panel display module and being placed in an approximate middle portion of the rear edge area of the flat panel display module;
a PCB cover positioned adjacent the control PCB, said control PCB being positioned between the PCB cover and the mold frame, wherein said PCB cover comprises a grounding hole exposing the conductive grounding part of the control PCB; and
a grounding contact member positioned adjacent the PCB cover opposite the control PCB, said grounding contact member including a rear contact part contacting the conductive grounding part of the control PCB from outside the PCB cover through the grounding hole, and a side contact part bent from the rear contact part and contacting the side part of the chassis, said grounding contact member grounding the control PCB.

2. The flat panel display apparatus according to claim 1, wherein the grounding contact member comprises a conductive foil material.

3. The flat panel display apparatus according to claim 1, wherein the grounding contact member is attached to the conductive grounding part of the control PCB by an adhesive.

4. The flat panel display apparatus according to claim 1, wherein the PCB cover includes a rear covering part covering the control PCB, and a side combining part bent from the PC3 rear covering part and coupled to the side part of the chassis.

5. The flat panel display apparatus according to claim 4, wherein the side combining part of the PCB cover includes an opening through which the side contact part contacts the side part of the chassis.

6. The flat panel display apparatus according to claim 1, wherein a supporting rib is formed on a rear surface of the mold frame, said supporting rib protruding from the rear surface of the mold frame toward the control PCB and supporting at least a portion of the circumference of the control PCB so as to leave a space between the control PCB and the rear surface of the mold frame.

7. The flat panel display apparatus according to claim 6, wherein an edge area of the control PCB is formed with a supporting hole, and
the supporting rib includes a supporting boss protruding toward the control PCB and received in the supporting hole of the control PCB.

8. A liquid crystal display (LCD) comprising:
an LCD panel having a substrate on which a LCD driver integrated chip (IC) is mounted;
a backlight assembly provided in the rear of the LCD panel and illuminating the LCD panel;
a mold frame;
a chassis coupled to the mold frame and combined to the backlight assembly so as to surround front edges of the LCD display panel and side parts of the backlight assembly;
a control printed circuit board (PCB) positioned in a rear edge area of the backlight assembly and having a conductive grounding part, the control PCB being shorter than the width of the backlight assembly, and being placed in an approximate middle portion of the rear edge area of the backlight assembly;
a flexible printed circuit (FPC) connecting the LCD driver IC with the control PCB;
a PCB cover positioned adjacent the control PCB, said control PCB being positioned between the PCB cover and the mold frame, wherein said PCB cover comprises a grounding hole exposing the conductive grounding part of the control PCB; and
a grounding contact member positioned adjacent the PCB cover opposite the control PCB, said grounding contact member including a rear contact part contacting the conductive grounding part of the control PCB from outside the PCB cover through the grounding hole, and a side contact part bent from the rear contact part and contacting a side part of the chassis, said grounding contact member grounding the control PCB.

9. The LCD according to claim 8, wherein the FPC is shorter than the width of the backlight assembly, and is connected to the control PCB in an approximate middle portion of the edge area of the LCD panel.

10. The LCD according to claim 9, wherein the backlight assembly comprises a light guide plate placed in the rear of the LCD panel and a lamp unit illuminating the light guide plate, wherein the mold frame is combined with the chassis so as to accommodate and support the light guide plate and the lamp unit, and
the control PCB is placed in one rear edge area of the mold frame.

11. The LCD according to claim 8, wherein the grounding contact member comprises a conductive foil material.

12. The LCD according to claim 8, wherein the grounding contact member is attached to the conductive grounding part of the control PCB by an adhesive.

13. The LCD according to claim 8, wherein the PCB cover includes a rear covering part covering the control PCB, and a side combining part bent from the rear covering part and coupled to the side part of the chassis.

14. LCD according to claim 13, wherein the side combining part of the PCB cover includes an opening through which the side contact part contacts the side part of the chassis.

15. The LCD according to claim 8, wherein a supporting rib is formed on a rear surface of the mold frame, said supporting rib protruding from the rear surface of the mold frame toward the control PCB and supporting at least a portion of the circumference of the control PCB so as to leave a space between the control PCB and the rear surface of the mold frame.

16. The LCD according to claim 15, wherein an edge area of the control PCB is formed with a supporting hole, and
the supporting rib includes a supporting boss protruding toward the control PCB and received in the supporting hole of the control PCB.

* * * * *